US010156146B2

(12) United States Patent
Walunj et al.

(10) Patent No.: US 10,156,146 B2
(45) Date of Patent: Dec. 18, 2018

(54) AIRFOIL WITH VARIABLE SLOT DECOUPLING

(71) Applicant: General Electric Company, Schenectady, NY (US)

(72) Inventors: Jalindar Appa Walunj, Bangalore (IN); Mark Steven Honkomp, Taylors, SC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 282 days.

(21) Appl. No.: 15/137,341

(22) Filed: Apr. 25, 2016

(65) Prior Publication Data

US 2017/0306765 A1    Oct. 26, 2017

(51) Int. Cl.
  *F02C 7/12*  (2006.01)
  *F01D 5/18*  (2006.01)
  *F01D 5/14*  (2006.01)

(52) U.S. Cl.
  CPC ............ *F01D 5/187* (2013.01); *F01D 5/147* (2013.01); *F02C 7/12* (2013.01); *F05D 2220/32* (2013.01); *F05D 2240/304* (2013.01); *F05D 2240/35* (2013.01); *F05D 2250/184* (2013.01); *F05D 2260/202* (2013.01); *F05D 2260/2212* (2013.01)

(58) Field of Classification Search
  CPC . F01D 5/147; F01D 5/187; F02C 7/12; F05D 2220/32; F05D 2240/304; F05D 2240/35; F05D 2250/184; F05D 2260/202; F05D 2260/2212
  See application file for complete search history.

(56) References Cited

U.S. PATENT DOCUMENTS 3,807,892 A * 4/1974 Frei ................. F01D 5/187
                                            415/116
4,021,139 A * 5/1977 Franklin ............. F01D 5/189
                                            415/115
5,503,529 A * 4/1996 Anselmi ............ F01D 5/186
                                            416/90 R (Continued)

FOREIGN PATENT DOCUMENTS

DE   10 2013 109 149 A1   3/2014
EP        0 034 961 A1   9/1981
EP        2 568 119 A2   3/2013

OTHER PUBLICATIONS

Translation of EP0034961, Culliver Leonard, Sep. 2, 1981.*

(Continued)

*Primary Examiner* — Jesse Bogue
(74) *Attorney, Agent, or Firm* — Dority & Manning, PA

(57) ABSTRACT

The present disclosure is directed to an airfoil for a gas turbine rotor blade. The airfoil includes a pressure side wall and a suction side wall connected to the pressure side wall at a leading edge portion and a trailing edge portion. The pressure side wall and the suction side wall collectively define an internal cavity within the airfoil. A plurality of pins is disposed within the internal cavity. The trailing edge portion defines a first cooling passage having a first inlet spaced apart from a first outlet by a first length and a second cooling passage comprising a second inlet spaced apart from a second outlet by a second length. The first length is greater than the second length.

17 Claims, 4 Drawing Sheets

(56) References Cited

U.S. PATENT DOCUMENTS

| | | | |
|---|---|---|---|
| 5,601,399 A * | 2/1997 | Okpara | F01D 5/187 415/115 |
| 5,993,156 A * | 11/1999 | Bailly | F01D 5/187 415/115 |
| 6,357,999 B1 * | 3/2002 | Pearce | F01D 5/08 415/115 |
| 6,503,053 B2 | 1/2003 | Huebner | |
| 6,905,309 B2 | 6/2005 | Nussbaum et al. | |
| 7,008,179 B2 | 3/2006 | Rinck et al. | |
| 7,029,227 B2 | 4/2006 | Berthillier et al. | |
| 7,497,664 B2 | 3/2009 | Walter et al. | |
| 8,147,205 B2 * | 4/2012 | Digard Brou De Cuissart | F01D 5/147 415/115 |
| 8,172,511 B2 | 5/2012 | Buong et al. | |
| 8,241,003 B2 | 8/2012 | Roberge | |
| 8,591,195 B2 | 11/2013 | DiFlorio et al. | |
| 2002/0081206 A1 | 6/2002 | Wang et al. | |
| 2005/0191167 A1 * | 9/2005 | Mongillo, Jr. | F01D 5/187 415/115 |
| 2009/0155082 A1 | 6/2009 | Duong et al. | |
| 2011/0274537 A1 | 11/2011 | Duong et al. | |
| 2013/0084191 A1 | 4/2013 | Jiang | |
| 2014/0064983 A1 * | 3/2014 | Jones | F01D 5/187 416/97 R |
| 2014/0093386 A1 * | 4/2014 | Pointon | F01D 5/187 416/96 R |
| 2015/0037165 A1 * | 2/2015 | Jones | F01D 5/186 416/232 |
| 2016/0245097 A1 | 8/2016 | Jones et al. | |
| 2017/0234142 A1 * | 8/2017 | Benson | F01D 5/187 60/806 |

OTHER PUBLICATIONS

Extended European Search Report and Opinion issued in connection with corresponding EP Application No. 17167805.5 dated Nov. 24, 2017.

* cited by examiner

AIRFOIL WITH VARIABLE SLOT DECOUPLING

FIELD OF THE TECHNOLOGY

The present disclosure generally relates to a rotor blade for a gas turbine engine. More particularly, the present disclosure relates to an airfoil for a gas turbine engine rotor blade.

BACKGROUND

A gas turbine engine generally includes a compressor section, a combustion section, a turbine section, and an exhaust section. The compressor section progressively increases the pressure of a working fluid entering the gas turbine engine and supplies this compressed working fluid to the combustion section. The compressed working fluid and a fuel (e.g., natural gas) mix within the combustion section and burn in a combustion chamber to generate high pressure and high temperature combustion gases. The combustion gases flow from the combustion section into the turbine section where they expand to produce work. For example, expansion of the combustion gases in the turbine section may rotate a shaft connected, e.g., to a generator to produce electricity. The combustion gases then exit the gas turbine via the exhaust section.

The turbine section includes a plurality of turbine rotor blades, which extract kinetic energy from the combustion gases flowing therethrough. Each of the turbine rotor blades include a pressure side wall and a suction side wall coupled together at a leading edge and a trailing edge. The pressure side and the suction side walls each exhibit a vibratory response motion (e.g., for a specific natural frequency) when excited by unsteady combustion gas pressures or other transient conditions in the turbine section. In certain instances, the turbine rotor blade may be sufficiently stiff to couple the vibratory responses of the pressure side and the suction side walls. This increases the natural frequency of blade and may coincide with the excitation frequency of unsteady gas pressures. In such instances, pressure side and the suction side walls may vibrate in phase with each other, which may be undesirable.

BRIEF DESCRIPTION OF THE TECHNOLOGY

Aspects and advantages of the technology will be set forth in part in the following description, or may be obvious from the description, or may be learned through practice of the technology.

In one aspect, the present disclosure is directed to an airfoil for a gas turbine rotor blade. The airfoil includes a pressure side wall and a suction side wall connected to the pressure side wall at a leading edge and a trailing edge. The pressure side wall and the suction side wall collectively define an internal cavity within the airfoil. A plurality of pins is disposed within the internal cavity. The trailing edge defines a first cooling passage having a first inlet spaced apart from a first outlet by a first length and a second cooling passage comprising a second inlet spaced apart from a second outlet by a second length. The first length is greater than the second length.

Another aspect of the present disclosure is directed to a gas turbine engine that includes a compressor section, a combustion section, and a turbine section. The turbine section includes one or more rotor blades. Each rotor blade includes a platform having a radially inner surface and a radially outer surface. A connection portion extends radially inwardly from the radially inner surface of the platform. An airfoil extends radially outwardly from the radially outer surface of the platform to an airfoil tip. The airfoil includes a pressure side wall and a suction side wall connected to the pressure side wall at a leading edge and a trailing edge. The pressure side wall and the suction side wall collectively define an internal cavity within the airfoil. A plurality of pins is disposed within the internal cavity. The trailing edge defines a first cooling passage having a first inlet spaced apart from a first outlet by a first length and a second cooling passage having a second inlet spaced apart from a second outlet by a second length. The first length is greater than the second length.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended Figs., in which.

Figure 1:
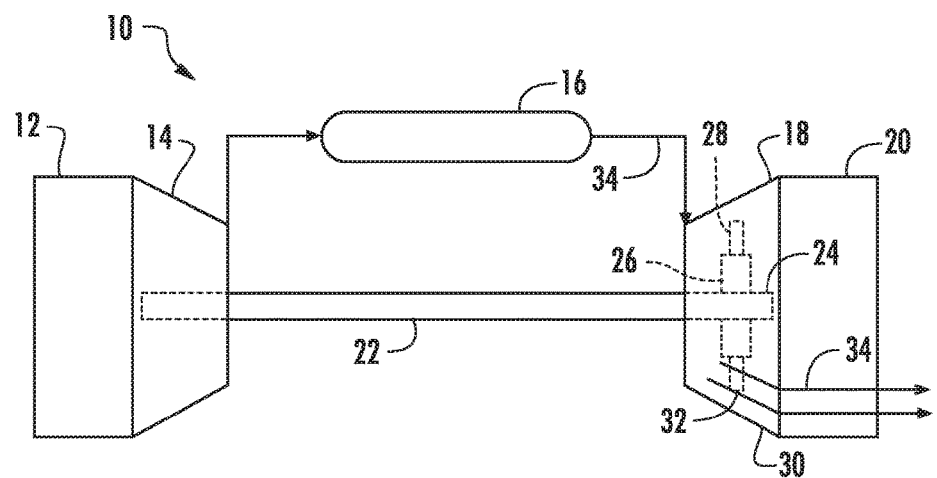
FIG. 1 is a schematic view of an exemplary gas turbine in accordance with the embodiments disclosed herein.

Repeat use of reference characters in the present specification and drawings is intended to represent the same or analogous features or elements of the present technology.

DETAILED DESCRIPTION OF THE TECHNOLOGY

Reference will now be made in detail to present embodiments of the technology, one or more examples of which are illustrated in the accompanying drawings. The detailed description uses numerical and letter designations to refer to features in the drawings. Like or similar designations in the drawings and description have been used to refer to like or similar parts of the technology. As used herein, the terms "first", "second", and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows.

Each example is provided by way of explanation of the technology, not limitation of the technology. In fact, it will be apparent to those skilled in the art that modifications and variations can be made in the present technology without departing from the scope or spirit thereof. For instance, features illustrated or described as part of one embodiment may be used on another embodiment to yield a still further embodiment. Thus, it is intended that the present technology covers such modifications and variations as come within the scope of the appended claims and their equivalents. Although an industrial or land-based gas turbine is shown and described herein, the present technology as shown and described herein is not limited to a land-based and/or industrial gas turbine unless otherwise specified in the claims. For example, the technology as described herein may be used in any type of turbine including but not limited to a steam turbine or marine gas turbine.

Now referring to the drawings, wherein identical numerals indicate the same elements throughout the figures, FIG. 1 schematically illustrates a gas turbine system 10. It should be understood that the turbine system 10 of the present disclosure need not be a gas turbine system 10, but rather may be any suitable turbine system, such as a steam turbine system or other suitable system. The gas turbine system 10 may include an inlet section 12, a compressor section 14, a combustion section 16, a turbine section 18, and an exhaust section 20. The compressor section 12 and turbine section 18 may be coupled by a shaft 22. The shaft 22 may be a single shaft or a plurality of shaft segments coupled together to form shaft 22.

The turbine section 18 may generally include a rotor shaft 24 having a plurality of rotor disks 26 (one of which is shown) and a plurality of rotor blades 28 extending radially outwardly from and being interconnected to the rotor disk 26. Each rotor disk 26 in turn, may be coupled to a portion of the rotor shaft 24 that extends through the turbine section 18. The turbine section 18 further includes an outer casing 30 that circumferentially surrounds the rotor shaft 24 and the rotor blades 28, thereby at least partially defining a hot gas path 32 through the turbine section 18.

During operation, a working fluid such as air flows through the inlet section 12 and into the compressor section 14, where the air is progressively compressed to provide pressurized air to the combustors (not shown) in the combustion section 16. The pressurized air mixes with fuel and burns within each combustor to produce combustion gases 34. The combustion gases 34 flow through the hot gas path 32 from the combustor section 16 into the turbine section 18, wherein energy (kinetic and/or thermal) is transferred from the combustion gases 34 to the rotor blades 28, thus causing the rotor shaft 24 to rotate. The mechanical rotational energy may then be used to power the compressor section 14 and/or to generate electricity. The combustion gases 34 exiting the turbine section 18 may then be exhausted from the gas turbine 10 via the exhaust section 20.

Figure 2:
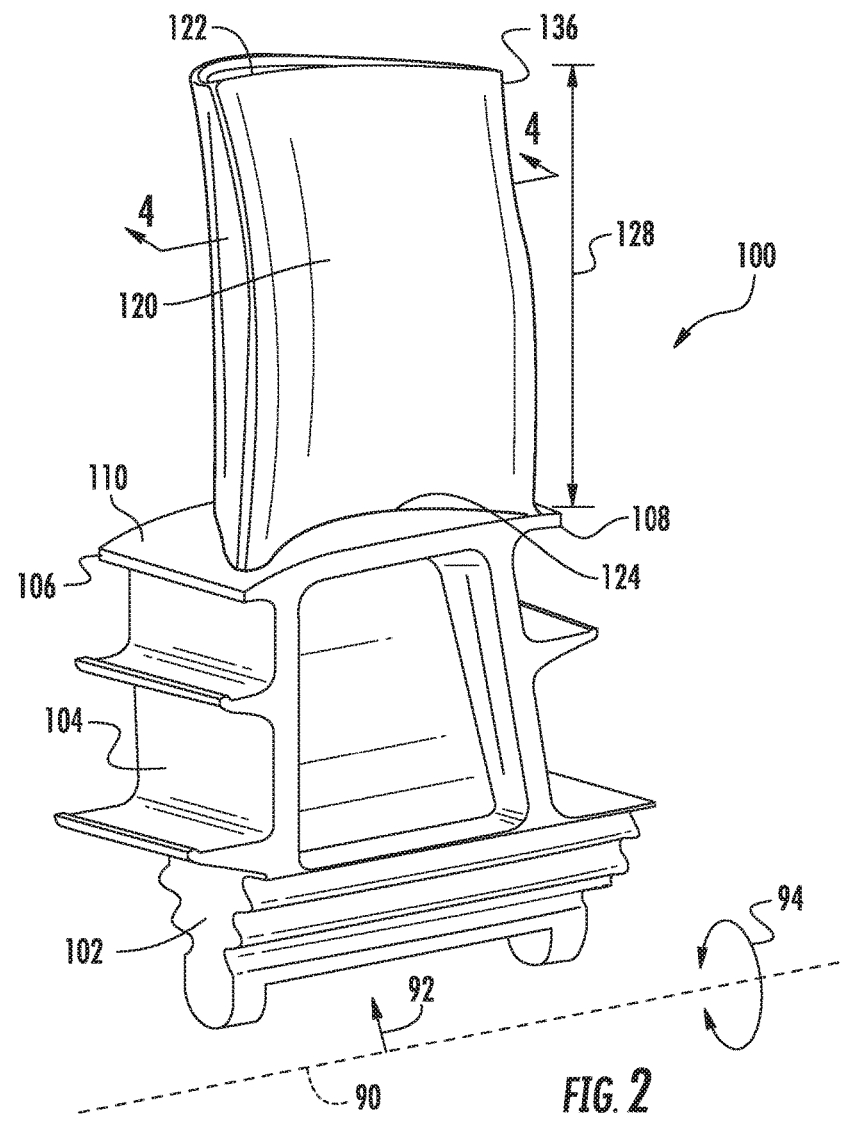
FIG. 2 is a perspective view of an exemplary rotor blade that may be incorporated in the gas turbine shown in FIG. 1 in accordance with the embodiments disclosed herein.
Figures 3, 4:
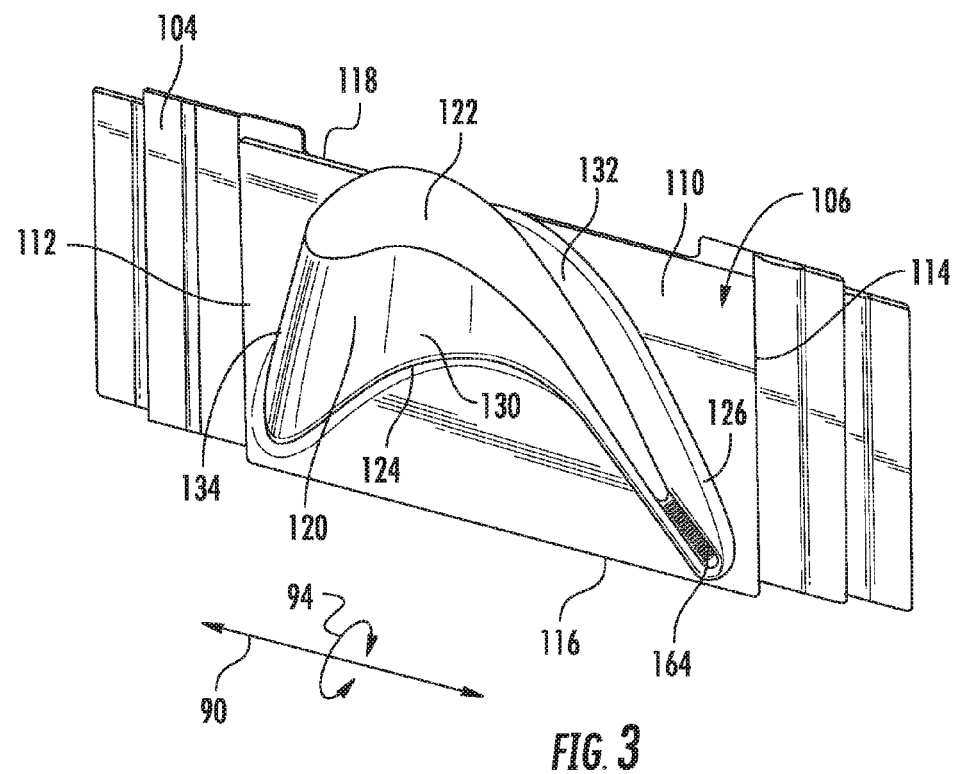
FIG. 3 is an alternate perspective view of the rotor blade shown in FIG. 2, further illustrating various features thereof.
FIG. 4 is a cross-sectional view of the rotor blade shown in FIGS. 2 and 3 taken generally about line 4-4 in FIG. 2, illustrating a plurality of internal cavities defined by the rotor blade.

FIGS. 2-3 are various views of an exemplary rotor blade 100, which may incorporate one or more embodiments disclosed herein and may be incorporated into the turbine section 18 of the gas turbine 10 in place of the rotor blade 28 shown in FIG. 1. As illustrated in FIGS. 2-3, the rotor blade 100 defines an axial direction 90, a radial direction 92, and a circumferential direction 94. The radial direction 92 extends generally orthogonal to the axial direction 90, and the circumferential direction 94 extends generally concentrically around the axial direction 90.

As shown in FIG. 2, the rotor blade 100 includes a root portion 102, which extends radially inwardly from a shank portion 104. The root portion 102 may interconnect or secure the rotor blade 100 to the rotor disk 26 (FIG. 1). In some embodiments, for example, the root portion 102 may have a dovetail configuration or a fir tree configuration. The root portion 102 and the shank portion 104 may collectively be referred to as the connection portion of the rotor blade 100.

Referring to FIGS. 2 and 3, the rotor blade 100 includes a platform 106, which generally serves as a radially inward flow boundary for the combustion gases 34 flowing through the hot gas path 32 of the turbine section 18 (FIG. 1). More specifically, the platform 106 includes a radially inner surface 108 radially spaced apart from a radially outer surface 110. The radially inner surface 108 of the platform 106 couples to the shank 104. As such, the shank 104 extends radially inwardly from the radially inner surface 108 of the platform 106. The platform 106 also includes a leading edge portion 112 axially spaced apart from a trailing edge portion 114. The leading edge portion 112 is positioned into the flow of combustion gases 34, and the trailing edge portion 114 is positioned downstream from the leading edge portion 112. Furthermore, the platform 106 includes a pressure-side slash face 116 circumferentially spaced apart from a suction-side slash face 118.

The rotor blade 100 further includes an airfoil 120 that extends radially outwardly from the radially outer surface 110 of the platform 106 to an airfoil tip 122. As such, the airfoil tip 112 generally defines the radially outermost portion of the rotor blade 100. The airfoil 120 connects to the platform 106 at an airfoil root 124 (i.e., the intersection between the airfoil 120 and the platform 106). In some embodiments, the airfoil root 124 may include a radius or fillet 126 that transitions between the airfoil 120 and the platform 106. In this respect, the airfoil 120 defines an airfoil span 128 extending between the airfoil root 124 and the airfoil tip 122. The airfoil 120 also includes a pressure-side wall 130 and an opposing suction-side wall 132. As illustrated in FIG. 4, the pressure-side wall 130 includes an outer surface 142 and an inner surface 144. Similarly, the suction-side wall 132 includes an outer surface 146 and an inner surface 148. The pressure-side wall 130 and the suction-side wall 132 are joined together or interconnected at a leading edge portion 134 of the airfoil 120, which is oriented into the flow of combustion gases 34. The pressure-side wall 130 and the suction-side wall 130 are also joined together or interconnected at a trailing edge portion 136 of the airfoil 120, which is spaced downstream from the leading edge portion 134. The pressure-side wall 130 and the suction-side wall 132 are continuous about the leading edge portion 134 and the trailing edge portion 136. The pressure-side wall 130 is generally concave, and the suction-side wall 132 is generally convex.

For reference purposes, the airfoil 120 defines a camber line 156 shown in FIG. 4. In particular, the camber line 156 extends from the leading edge portion 134 to the trailing edge portion 136. Furthermore, the camber line 156 is positioned equidistant from the outer surface 142 of the pressure side wall 130 and the outer surface 146 of the suction side wall 132.

As illustrated in FIG. 4, the pressure-side wall 130, the suction-side wall 132, and/or one or more baffles 140 may collectively define one or more internal cavities 138 through which cooling air may flow. In particular, the one or more baffles 140 may extend between the inner surface 144 of the pressure side wall 130 and the inner surface 146 of the suction side wall 132. In some embodiments, the one or more baffles 138 may be arranged so that the internal cavities 138 form one or more serpentine channels. In the embodiment illustrated in FIG. 4, for example, five baffles 140 define six internal cavities 138. As such, the three internal cavities 138 closest to the leading edge portion 134 may constitute one serpentine channel, and the three internal cavities 138 closest to the trailing edge portion 136 may constitute a second serpentine channel. Nevertheless, the airfoil 120 may define more or less internal cavities 138 so long as there is at least one internal cavity 138. Accordingly, the airfoil 120 may have any number of baffles 140 necessary to create the necessary or desired number of internal cavities 138. In some embodiments, however, the airfoil 120 may not include any baffles 140.

Figure 5:
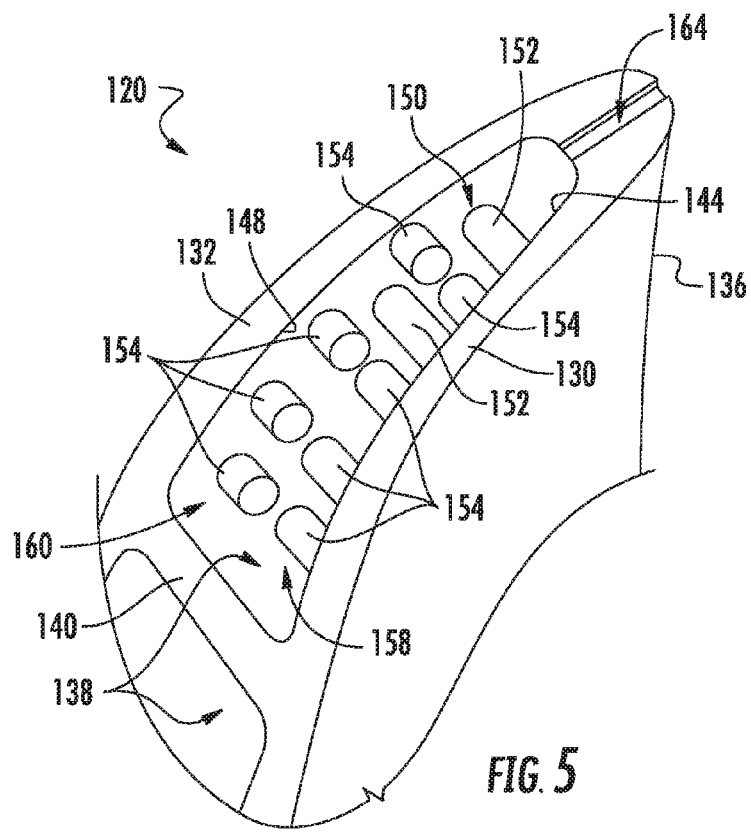
FIG. 5 is a perspective view of a portion of the rotor blade shown in FIGS. 2-4, illustrating a plurality of pins including a first subset of pins and a second subset of pins positioned in one of the plurality of internal cavities.

Referring to FIG. 5, the airfoil 120 includes a plurality of pins or a pin bank 150 positioned in one or more of the internal cavities 138. The plurality of pins 150 increases the rate of heat transfer between the pressure side and/or suction side walls 130, 132 and the cooling air flowing through the internal cavity 138 by increasing the amount of surface area of in contact with the cooling air flow. Furthermore, the plurality of pins 150 may selectively control the vibratory response of the airfoil 120 as will be discussed in greater detail below. In the embodiment shown in FIG. 5, the plurality of pins 150 is positioned in the internal cavity 138 closest to the trailing edge portion 136. The plurality of pins 150 may extend along the entire span 128 of the airfoil 120 or only a portion thereof. In some embodiments, additional pluralities of pins or pin banks 150 may be positioned in one or more of the other internal cavities 138.

The plurality of pins 150 includes a first subset of pins 152. More specifically, each of the pins 152 extends from the inner surface 144 of the pressure side wall 130 to the inner surface 148 of the suction side wall 132. In this respect, the first subset of pins 152 spans the internal cavity 138, thereby coupling the pressure side and suction side walls 130, 132. Although the embodiment shown in FIG. 5 includes two pins 152, the plurality of pins 150 may include more or less pins 152 as is necessary or desired. While the pins 152 shown in FIG. 5 have a cylindrical shape, the pins may have any suitable shape (e.g., rectangular, oval, triangular, etc.) as well. Furthermore, the each of the pins 152 may have the same diameter (e.g., as shown in FIG. 5) or different diameters.

The plurality of pins 150 also includes a second subset of pins 154. More specifically, each of the pins 154 extends from one of the inner surfaces 144, 148 of the pressure side or the suction side walls 130, 132 to a position within the internal cavity 138 spaced apart from the inner surfaces 148, 144 of the suction side and pressure side walls 132, 130. In this respect, and unlike the pins 152, the pins 154 do not couple the pressure side and suction side walls 130, 132. In the embodiment shown in FIG. 5, the pins 154 extend outwardly from both the inner surfaces 144, 148 of the pressure side and the suction side walls 130, 132. That is, a first portion 158 of the second subset of the pins 154 couples to the inner surface 144 of the pressure side wall 130. Similarly, a second portion 160 of the second subset of pins 154 couples to the inner surface 148 of the suction side wall 132. In other embodiments, however, the pins 154 may extend outwardly from only one of the inner surfaces 144, 148 of the pressure side and the suction side walls 130, 132.

Figure 6:
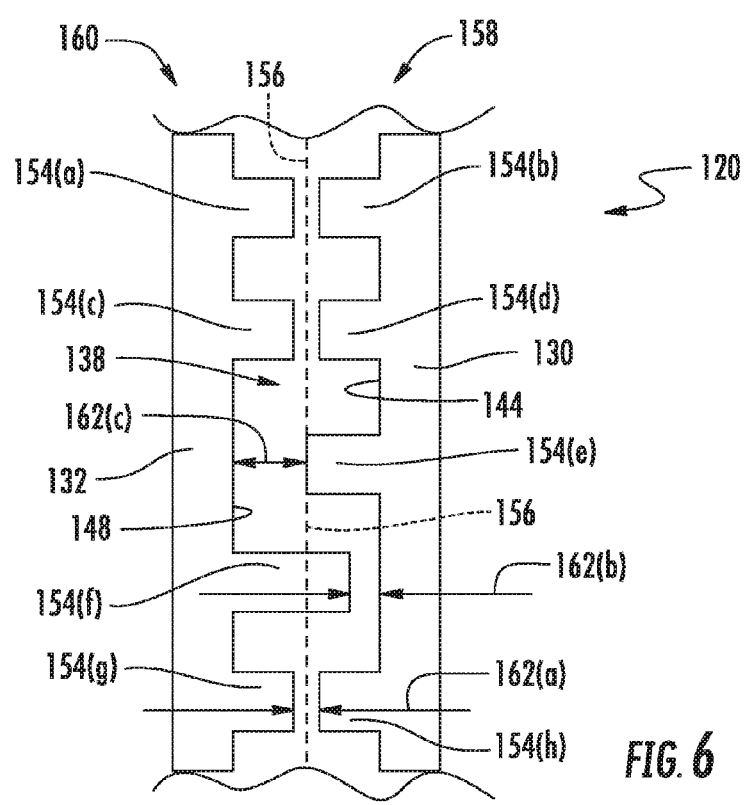
FIG. 6 is a schematic view of an embodiment of the second subset of pins shown in FIG. 5, illustrating the relative positioning thereof.

FIG. 6 illustrates an embodiment of the second subset of pins 154. In this respect, the second subset of pins 154 includes a pin 154(a), a pin 154(b), a pin 154(c), a pin 154(d), a pin 154(e), a pin 154(f), a pin 154(g), and a pin 154(h). For the purposes of clarity, the pressure side and suction side walls 130, 132 of the airfoil 120 are planar in FIG. 6. Nevertheless, the pressure side and suction side walls 130, 132 are typically curved in most embodiments, such as those illustrated in FIGS. 2-5.

As mentioned above, the pins 154 may extend from the inner surfaces 144, 148 of the pressure side or suction side walls 130, 132 to a position within the internal cavity 138 spaced apart from the inner surfaces 148, 144 of the suction side and pressure side walls 132, 130. This position may be between the inner surface 144 of the pressure side wall 130 and the camber line 156, on the camber line 156, or between the camber line 156 and the inner surface 148 of the suction side wall 132. In the embodiment shown in FIG. 6, for example, the pins 154(b), 154(d), 154(f), 154(h) extend from the inner surfaces 144, 148 of the pressure side or suction side walls 130, 132 to a position between the inner surface 144 of the pressure side wall 130 and the camber line 156. The pins 154(a), 154(c), 154(g) extend from the inner surface 148 of the suction side wall 132 to a position between the inner surface 148 of the suction side wall 132 and the camber line 156. The pin 154(e) extends from the inner surface 144 of the pressure side wall 130 to the camber line 156. In alternate embodiments, the second subset of pins 154 may include any suitable combination of pins 154 that extend to positions between the inner surface 144 of the pressure side wall 130 and the camber line 156, on the camber line 156, or between the camber line 156 and the inner surface 148 of the suction side wall 132. Furthermore, the pins 154 may extend across the camber line 156 or fail to extend to or across the camber line 156. In the embodiment shown in FIG. 6, the pin 154(f) extends across the camber line 156 and the pins 154(a-d), 154(g-h) fail to cross the camber line 156. Although, the second subset of pins 154 may include any suitable combination of pins 154 that extend across the camber line 156, extend to the camber line 156, or fail to extend to or across the camber line 156.

At least one pin 154 in the first portion 158 of the second subset of pins 154 is aligned with at least one pin 154 in the second portion 160 of the second subset of pins 154. Specifically, the at least one pin 154 in the first portion 158 and the at least one pin 154 in the second portion 160 respectively include coaxial axes extending orthogonal to the inner surfaces 144, 148 of the pressure side or suction side walls 130, 132. In the embodiment shown in FIG. 6, for example, the pin 154(a) is coaxial with the pin 154(b), the pin 154(c) is coaxial with the pin 154(d), and the pin 154(g) is coaxial with the pin 154(h). In this respect, the aligned pins 154 define a gap 162(a) therebetween. Although FIG. 6 only shows the gap 162(a) defined between the pins 154(g) and 154(h), all of the coaxial pins 154 may define the gap 162(a) therebetween. Some of the pins 154 may not be coaxial in certain embodiments. For example, the pin 154(e) is spaced apart along the camber line 156 from the pin 154(f). In this respect, the pin 154(f) and the pressure side wall 130 define a gap 162(b) therebetween, and the pin 154(e) and the suction side wall 132 define a gap 162(c) therebetween. Nevertheless, the second subset of pins 154 may include any suitable combination of aligned and/or unaligned pins 154.

The pins 154 (e.g., the pins 154(a-h)) may have any suitable shape or size. For example, the pins 154 may be cylindrical, conical, frustoconical, hemispherical, or cube-like. FIGS. 5 and 6 show that the ends of the pins 154 positioned in the internal cavity 138 and spaced from the pressure side and suction side walls 130, 132 are planar. Although, these ends of the pins 154 may be conical, hemispherical, or any other suitable shape. Each of the pins 154 may have the same diameter (e.g., as shown in FIGS. 5 and 6) or different diameters. Furthermore, the pins 154 may be the same size or different sizes than the pins 152.

Referring now to FIGS. 3 and 5, the trailing edge portion 136 of the airfoil 120 defines a plurality of cooling passages 164 extending therethrough. As illustrated in FIG. 5, the plurality of cooling passages 164 are in fluid communication with the internal cavity 138 closest to the trailing edge portion 136. In this respect, the plurality of cooling passages 164 permit cooling air flowing through the internal cavities 138 to exit the airfoil 120 and flow into the hot gas path 32. The lengths of each of the plurality of cooling passages 164 may be adjusted to selectively control the vibratory response of the airfoil 120 as will be described in greater detail below. As shown in FIG. 3, the plurality of cooling passages 164 preferably extends along the entire span 128 of the airfoil 120.

Figure 7:
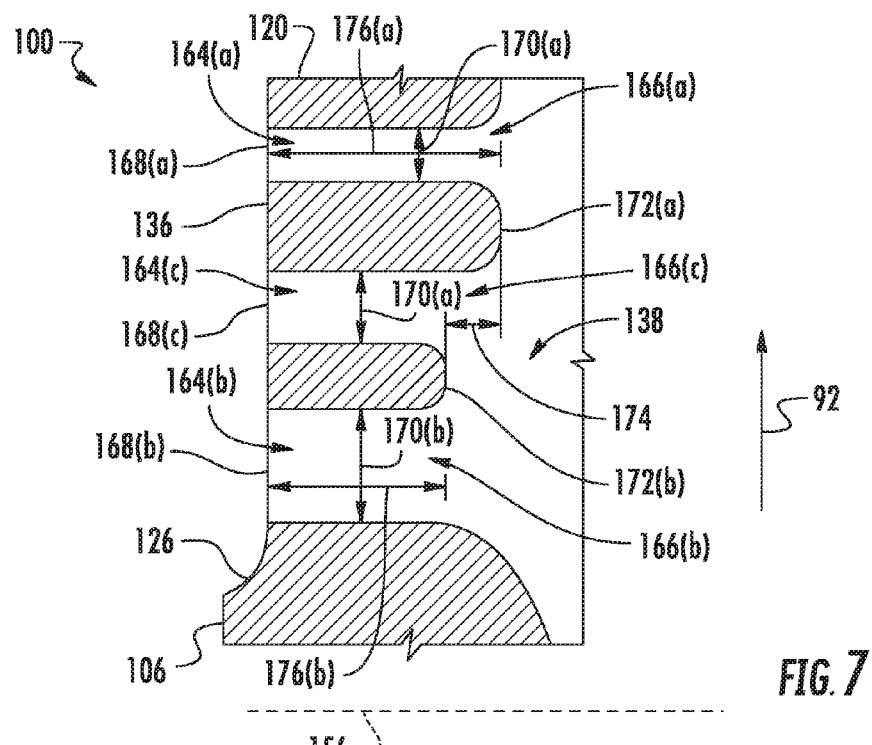
FIG. 7 is a cross-sectional view of a portion of the rotor blade shown in FIGS. 2-5, illustrating a plurality of cooling passages defined in a trailing edge thereof.

FIG. 7 illustrates a portion of the plurality of passages 164 in further detail. More specifically, the plurality of cooling passages 164 includes a first cooling passage 164(a) having a first width 170(a) and extending from a first inlet 166(a) to a first outlet 168(a) spaced apart from the first inlet 166(a) by a first length 176(a). The plurality of cooling passages 164 also includes a second cooling passage 164(b) having a second width 170(b) and extending from a second inlet 166(b) to a second outlet 168(b) spaced apart from the second inlet 166(b) by a second length 176(b). The first length 176(a) is greater than the second length 176(b). Furthermore, the plurality of cooling passages 164 may also include a third cooling passage 164(c) having a third width 170(c) and extending from a third inlet 166(c) to a third outlet 168(c). In the embodiment shown in FIG. 7, the second width 170(b) of the second cooling passage 164(b) is greater than the third width 170(c) of the third cooling passage 164(c), and the third width 170(c) of the third cooling passage 164(c) is greater than the first width 170(a) of the first cooling passage 164(a).

The first cooling passage 164(a) is positioned radially outwardly from the third cooling passage 164(c), and the third cooling passage 164(c) is positioned radially outwardly from the second cooling passage 164(b). In fact, the second cooling passage 164(b) is located closest to the platform 106 of all of the plurality of cooling passages 164 in the embodiment shown in FIG. 7. In this respect, a first radius 172(a) extends from the first inlet 166(a) to the third inlet 166(c), and a second radius 172(b) extends from the third inlet 166(c) to the second inlet 166(b). The first and the second radii 172(a), 172(b) are spaced apart along the camber line 156 by an offset gap 174. In this respect, the first and the third inlets 166(a), 166(b) are also spaced apart along the camber line 156 the offset gap 174 as well. As such, the second inlet 166(b) of the second cooling passage 164(b) is positioned along the camber line 156 between the first inlet 166(a) and the first outlet 168(a) of the first cooling passage 164(a). The offset gap 174 may be a ratio of the second length 176(b) of the second cooling passage 164(b) to the first length 176(a) of the first cooling passage 164(a). In some embodiments, this ratio is 0.05 and 1.0. In particular embodiments, the offset gap 174 reduces the stress in the second radius 172(a) during gas turbine operation. In the embodiment shown in FIG. 7 the length ratio may be tailored to preferentially distribute the combined mechanical, thermal, and vibratory stress loading in the radii to maximize durability particular to the airfoil trailing edge root region and increase service life.

As discussed above, FIG. 7 illustrates one first cooling passage 164(a), one second cooling passage 164(b), and one third cooling passage 164(c). Nevertheless, the trailing edge portion 136 may define a plurality of the first cooling passages 164(a), a plurality of the second cooling passages 164(b), and/or a plurality of the third cooling passages 164(c). Some embodiments may not include one or more of the first, the second, or the third cooling passages 164(a-c). Furthermore, the first, the second, or the third cooling passages 164(a-c) may be arranged in any suitable manner.

As discussed in greater detail above, the stiffness of the pressure side and suction side walls 130, 132 is of particular importance to the vibratory response of the airfoil 120. In this respect, the presence the first subset of pins 152, which couple the pressure side and the suction walls 130, 132, increases the stiffness of the pressure side and suction side walls 130, 132. Conversely, the presence of the second subset of pins 154, which do not couple the pressure side and the suction walls 130, 132, decreases the stiffness of the pressure side and suction side walls 130, 132. With respect to the plurality of cooling passages 164, increasing the length 176 from the inlet 166 to the outlet 168 thereof increases the stiffness of the pressure side and suction side walls 130, 132. Conversely, decreasing the length 176 from the inlet 166 to the outlet 168 of the cooling passages 164 decreases the stiffness of the pressure side and suction side walls 130, 132.

In this respect, the plurality of pins 150 and the plurality of cooling passages 164 may be used to tune the vibratory response of the airfoil 120. More specifically, the vibratory response of the airfoil 120 may be tuned by selectively increasing or decreasing the stiffness thereof. Increasing the number of pins 152 and/or increasing the length of the cooling passages 164 increases the stiffness of the airfoil 120. Conversely, increasing the number of pins 154 and decreasing the length of the cooling passages 164 decreases the stiffness of the airfoil 120. Selectively increasing and/or decreasing the stiffness of the airfoil 120 at various positions along the span thereof decouples vibratory response of the pressure side and the suction side walls 130, 132. This causes the pressure side and the suction side walls 130, 132 to vibrate out of phase with respect to each other, thereby canceling some of the net modal force experience by the airfoil and providing aerodynamic damping and reducing the vibratory response of the airfoil 120. Accordingly, the airfoil 120 experiences less deflection, thereby reducing wear and increasing service life.

Figure 8:
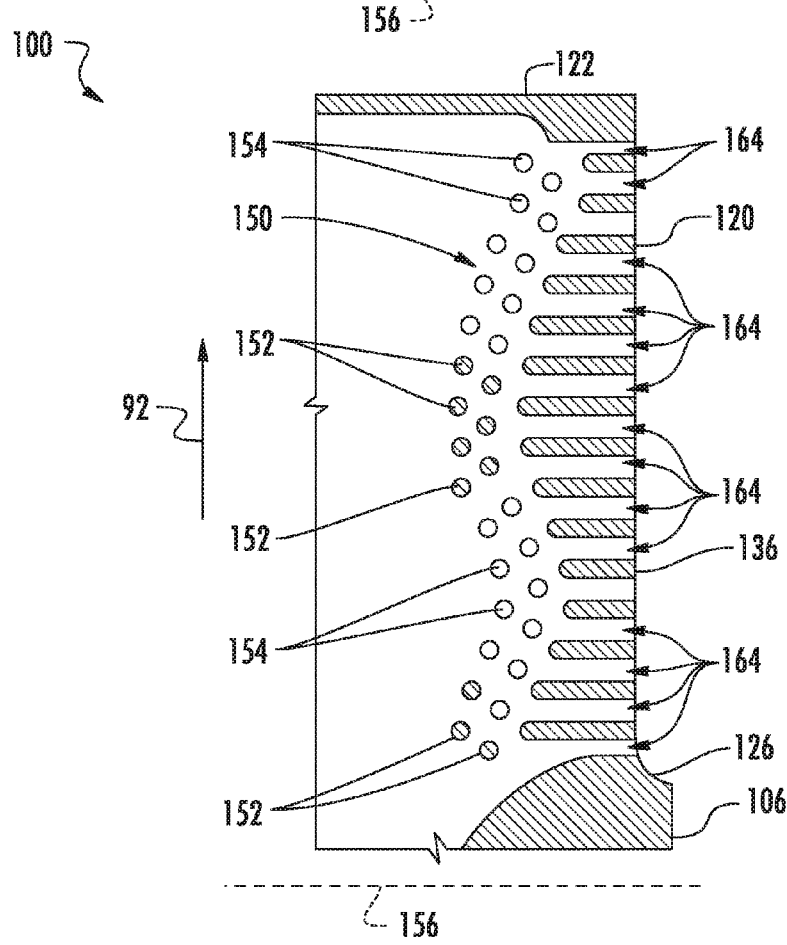
FIG. 8 is a cross-sectional view the rotor blade shown in FIGS. 2-5, illustrating an embodiment of the plurality of pins and the plurality of cooling passages.

FIG. 8 illustrates one embodiment of the airfoil 120 that uses the pins 152, 154 and various lengths for the plurality of the cooling passages to tune the vibratory response of the airfoil as discussed above. As illustrated in FIG. 8, the airfoil 120 includes the pin bank 150 and the plurality of cooling passages 164. More specifically, the pin 150 includes an arrangement of the pins 152 and the pins 154. Nevertheless, the pin bank 150 may include other arrangements of the pins 152 and the pins 154 as well. Furthermore, the plurality of cooling passages 164 has various different lengths. For example, the lengths of the radially inner cooling passages 164 (i.e., the cooling passages 164 near the platform 106) are shorter than the lengths of the radially outer cooling passages 164 (i.e., the cooling passages 164 near the airfoil tip 122). As such, the radially outer portion of the airfoil 120 is stiffer than the radially inner portions thereof. Nevertheless, other embodiments of the airfoil 120 may include different arrangements of the pins 152, 154 and/or lengths of the cooling passages 164 depending on the specific characteristics of the airfoil 120. In fact, adjusting the arrangement of the pins 152, 154 and the lengths of the cooling passages 164 may produce numerous embodiments that decouple the vibratory responses of the pressure side and suction side walls 130, 132 in accordance with the present disclosure.

As shown in FIG. 8, the lengths of the cooling passages 164 are shortened and the pins 152 are positioned where maximum displacement occurs to reduce the vibratory response. The lengths of the cooling passages 164 are increased gradually towards nodal line regions. The pins 152 may also be positioned proximate to the nodal lines. In alternate embodiments, all of the lengths of the cooling passages 164 may be shortened by uniform amount and coupled with a specific configuration of the pins 152, 154 to reduce the vibratory response. These embodiments are easier to manufacture, but may have a less efficient mechanical and heat transfer design.

In this respect, the pressure side and suction side walls 130, 132 of the airfoil 120 vibrate out of phase with each other. This reduces the net modal force experienced by the airfoil 120, thereby canceling some of the forces from unsteady pressures and providing aerodynamic damping.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An airfoil for a gas turbine rotor blade, comprising:
    a pressure side wall;
    a suction side wall connected to the pressure side wall at a leading edge portion and a trailing edge portion, the pressure side wall and the suction side wall collectively defining an internal cavity within the airfoil; and
    a plurality of pins disposed within the internal cavity;
    wherein the trailing edge portion defines a first cooling passage comprising a first inlet spaced apart from a first outlet by a first length and a second cooling passage comprising a second inlet spaced apart from a second outlet by a second length, the first length being greater than the second length, and a third cooling passage comprising a third inlet spaced apart from a third outlet by a third length, the third length being less than the first and second lengths, the third cooling passage being positioned radially between the first and second cooling passages, and wherein at least one of the first cooling passage, second cooling passage, and third cooling passage is parallel to another one of the first cooling passage, second cooling passage, and third cooling passage.

2. The airfoil of claim 1, wherein a first diameter of the first cooling passage is less than a second diameter of the second cooling passage.

3. The airfoil of claim 1, wherein the first inlet of the first cooling passage is spaced apart along a camber line from the second inlet of the second cooling passage.

4. The airfoil of claim 3, wherein the second inlet of the second cooling passage is positioned between the first inlet of the first cooling passage and the first outlet of the first cooling passage along the camber line.

5. The airfoil of claim 1, wherein the trailing edge portion defines the third cooling passage comprising the third inlet spaced apart from the third outlet, and wherein a third diameter of the third cooling passage is less than the second diameter and greater than the first diameter.

6. The airfoil of claim 5, wherein the first cooling passage comprises a plurality of first cooling passages, the second cooling passage comprises a plurality of second cooling passages, and the third cooling passage comprises a plurality of third cooling passages.

7. The airfoil of claim 5, wherein the first cooling passage is positioned radially outwardly from the third cooling passage, and wherein the third cooling passage is positioned radially outwardly from the second cooling passage.

8. The airfoil of claim 1, wherein the plurality of pins comprises:
    a first subset of the plurality of pins extending from an inner surface of the pressure side wall to an inner surface of the suction side wall; and
    a second subset of the plurality of pins extending from the inner surface of the pressure side wall or the inner surface of the suction side wall to a position within the internal cavity spaced apart from the inner surface of the pressure side wall and the inner surface of the suction side wall.

9. The airfoil of claim 8, wherein at least one pin of the second subset of the plurality of pins extends from the inner surface of the pressure side wall or the inner surface of the suction side wall to a position on a camber line of the airfoil.

10. The airfoil of claim 8, wherein a first portion of the second subset of the plurality of pins couples to the inner surface of the pressure side wall and a second portion of the second subset of the plurality of pins couples to the inner surface of the suction side wall.

11. The airfoil of claim 10, wherein the first portion of the second subset of the plurality of pins comprises a first pin and the second portion of the second subset of the plurality of pins comprises a second pin, and wherein the first pin is coaxial with the second pin.

12. A gas turbine engine, comprising:
    a compressor section;
    a combustion section; and
    a turbine section comprising one or more rotor blades, each rotor blade comprising:
        a platform comprising a radially inner surface and a radially outer surface;
        a connection portion extending radially inwardly from the radially inner surface of the platform; and
        an airfoil extending radially outwardly from the radially outer surface of the platform to an airfoil tip, the airfoil comprising:
            a pressure side wall;
            a suction side wall connected to the pressure side wall at a leading edge and a trailing edge, the pressure side wall and the suction side wall collectively defining an internal cavity within the airfoil; and
            a plurality of pins disposed within the internal cavity;
            wherein the trailing edge defines a first cooling passage comprising a first inlet spaced apart from a first outlet by a first length and a second cooling passage comprising a second inlet spaced apart from a second outlet by a second length, the first length being greater than the second length, and a third cooling passage comprising a third inlet spaced apart from a third outlet by a third length, the third length being less than the first and second lengths, the third cooling passage being positioned radially between the first and second cooling passage, and wherein at least one of the first cooling passage, second cooling passage, and third cooling passage is parallel to another one of the first cooling passage, second cooling passage, and third cooling passage.

13. The gas turbine engine of claim 12, wherein a first diameter of the first cooling passage is less than a second diameter of the second cooling passage.

14. The gas turbine engine of claim 12, wherein the trailing edge defines the third cooling passage comprising the third inlet spaced apart from the third outlet, and wherein a third diameter of the third cooling passage is less than the second diameter and greater than the first diameter.

15. The gas turbine engine of claim 12, wherein the plurality of pins comprises:
   a first subset of the plurality of pins extending from an inner surface of the pressure side wall to an inner surface of the suction side wall; and
   a second subset of the plurality of pins extending from the inner surface of the pressure side wall or the inner surface of the suction side wall to a position within the internal cavity spaced apart from the inner surface of the pressure side wall and the inner surface of the suction side wall.

16. The gas turbine engine of claim 15, wherein at least one pin of the second subset of the plurality of pins extends from the inner surface of the pressure side wall or the inner surface of the suction side wall to a position on a camber line of the airfoil.

17. The gas turbine engine of claim 15, wherein a first portion of the second subset of the plurality of pins couples to the inner surface of the pressure side wall and a second portion of the second subset of the plurality of pins couples to the inner surface of the suction side wall.

\* \* \* \* \*